US009323296B2

(12) United States Patent
Ngai et al.

(10) Patent No.: US 9,323,296 B2
(45) Date of Patent: Apr. 26, 2016

(54) THERMAL MITIGATION IN DUAL SIM DUAL ACTIVE DEVICES

(71) Applicant: QUALCOMM Incorporated, San Diego, CA (US)

(72) Inventors: Francis M. Ngai, Louisville, CO (US); Amy Derbyshire, Boulder, CO (US); Ronald F. Alton, Oceanside, CA (US); Amit Mahajan, San Diego, CA (US); Michael L. McCloud, San Diego, CA (US); Reza Shahidi, San Diego, CA (US); Sridhar Bandaru, Westminster, CO (US); Ashish V Gaonekar, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 495 days.

(21) Appl. No.: 13/919,415

(22) Filed: Jun. 17, 2013

(65) Prior Publication Data
US 2014/0200685 A1 Jul. 17, 2014

Related U.S. Application Data

(60) Provisional application No. 61/753,419, filed on Jan. 16, 2013.

(51) Int. Cl.
*G06F 1/20* (2006.01)
*H04W 52/02* (2009.01)
*G06F 9/48* (2006.01)

(52) U.S. Cl.
CPC ............... *G06F 1/203* (2013.01); *G06F 1/206* (2013.01); *G06F 9/4893* (2013.01); *H04W 52/0209* (2013.01); *H04W 52/0216* (2013.01); *H04W 52/0258* (2013.01); *Y02B 60/50* (2013.01)

(58) Field of Classification Search
CPC ....... G06F 1/203; G06F 1/206; G06F 9/4893; H04W 52/0209; H04W 52/0216; H04W 52/0258; Y02B 60/50
See application file for complete search history.

(56) References Cited

U.S. PATENT DOCUMENTS 7,860,018 B2 * 12/2010 Raith .................... H04B 1/036
370/252
8,009,577 B2 * 8/2011 Karam ................ H04M 1/2535
370/252

(Continued)

FOREIGN PATENT DOCUMENTS

EP         1873652 A2    1/2008
WO    2009143487 A2   11/2009

OTHER PUBLICATIONS

International Search Report and Written Opinion—PCT/US2014/030844—ISA/EPO—Jul. 7, 2014.

*Primary Examiner* — M. N. Von Buhr
(74) *Attorney, Agent, or Firm* — The Marbury Law Group, PLLC

(57) ABSTRACT

A system, a method and an apparatus are described. The apparatus includes a modem that responds to a thermal mitigation request by invoking different levels of thermal mitigation for different concurrently active connections. In some instances, the modem may invoke thermal mitigation with respect to a first active connection and refrain from invoking thermal mitigation with respect to a second active connection maintained by the modem. The apparatus determines the first and second active connections based on subscriptions corresponding to subscriber identification modules, an identification of a power amplifier or group of power amplifiers responsible for a thermal issue in the modem. The selection of mitigation levels for each active connection and decisions to invoke mitigation on one connection while refraining from invoking mitigation on another connection may be based on priorities of the active connections, including quality of service related priorities.

76 Claims, 10 Drawing Sheets

(56) References Cited

U.S. PATENT DOCUMENTS

| | | | |
|---|---|---|---|
| 8,452,323 B2* | 5/2013 | Anderson | H04W 52/0258 340/539.27 |
| 8,498,328 B2* | 7/2013 | Dhandu | H04L 1/0002 375/219 |
| 8,620,235 B2* | 12/2013 | Riddle | G06F 1/206 455/117 |
| 8,665,779 B2* | 3/2014 | Burgan | H04W 52/343 370/318 |
| 9,019,880 B2* | 4/2015 | Ehsan | H04W 52/146 370/229 |
| 9,055,470 B2* | 6/2015 | Sahu | H04W 52/0261 |
| 2009/0215442 A1* | 8/2009 | Lindoff | H04B 1/036 455/423 |
| 2010/0210304 A1 | 8/2010 | Huslak | |
| 2011/0280169 A1* | 11/2011 | Seo | H04W 52/146 370/311 |
| 2012/0020286 A1* | 1/2012 | Damnjanovic | H04W 52/281 370/328 |
| 2012/0329410 A1 | 12/2012 | Balakrishnan et al. | |
| 2013/0332720 A1* | 12/2013 | Gupta | G06F 9/4893 713/100 |
| 2014/0199952 A1* | 7/2014 | Sandhu | H03F 1/303 455/91 |

* cited by examiner

THERMAL MITIGATION IN DUAL SIM DUAL ACTIVE DEVICES

CLAIM OF PRIORITY UNDER 35 U.S.C. §119

The present application for patent claims the benefit of priority to U.S. Provisional Application No. 61/753,419 entitled "Thermal Mitigation In Dual SIM Dual Active Devices" filed Jan. 16, 2013 and assigned to the assignee hereof, which is hereby expressly incorporated by reference herein.

BACKGROUND

1. Field

Various features relate to the thermal management of an integrated semiconductor device, system, and/or package.

2. Background

Wireless devices typically comprise integrated semiconductor devices, which may also be referred to as integrated circuits (ICs), which may include one or more processors, memory and a modem used for wireless communications. An IC may be provided on a die in a package that includes one or more dice provided on a substrate, and some degree of thermal coupling exists between the dice. Each of the one or more dice may have different operating temperature tolerance ranges based on the nature of the circuits carried by the one or more dice. In one example, a processor may have an operating temperature tolerance between −40° C. and +125° C. In another example, a memory may have an operating temperature tolerance between 0° C. and +70° C. Modems may comprise one or more power amplifiers (PAs) that can generate significant heat, which may disrupt operations of components within the IC or within packaging housing the IC.

Thermal issues caused by heat generation within the IC or its packaging may be ameliorated by reducing power usage by one or more devices. Temperature of the one or more dice is regulated based on temperature readings obtained from temperature sensors that measure temperature of the dice, packaging and/or skin of a case housing the apparatus. Generally, dice temperature is controlled to remain within temperature tolerances of component circuits and/or to control device skin temperature to comply with regulatory touch temperature limits for the case (or skin) temperature based on device material (ceramic, glass, metal, etc.). In one example, case and skin temperature limits are specified by the UL/IEC 60950-1 standard. Other limitations, including comfort level limits for case and/or skin temperature, may be application and/or scenario specific. For example, a person actively engaged in a video game may not notice increased device temperature that would draw the attention of a person someone using the device to read a book. In some integrated semiconductor devices, the heat from one component or die may affect other nearby components or dice. For example, although a modem on a die may be operable at a temperature near its higher temperature tolerance range, a processor or memory provided on the same die or in the same package may be caused to shut down because this temperature is too high for the processor or memory.

SUMMARY

Various aspects include a method, a computer program product, and an apparatus providing an improved method for thermal management of modems in integrated semiconductor devices, systems, and/or packages. The apparatus may comprise a wireless modem.

In an aspect, the apparatus may be configured to receive a mitigation request for the wireless modem, determine whether one or more active connections are currently maintained by the wireless modem, and invoke different levels of thermal mitigation for two active connections in response to the mitigation request when it is determined that a plurality of active connections is currently maintained by the modem. The different levels of thermal mitigation for the two active connections may be selected based on priorities associated with the active connections.

In an aspect, different levels of thermal mitigation for the two active connections may be invoked in response to the mitigation request by invoking a first level of thermal mitigation with respect to a first active connection and refraining from invoking thermal mitigation for a second active connection or invoking a second level of thermal mitigation for the second active connection.

In an aspect, one level of thermal mitigation may be invoked by initiating or modifying flow control on one active connection. One level of thermal mitigation may be invoked by initiating or increasing a power limitation of a transmitter of the wireless modem.

In an aspect, a first active connection may be associated with a first subscriber identification module (SIM) of a dual SIM dual active (DSDA) device, while a second active connection is associated with a second SIM of the DSDA device. The different levels of thermal mitigation for the two active connections may be selected based on priorities associated with subscriptions corresponding to the first and second SIMs.

In an aspect, different levels of thermal mitigation for the two active connections may be invoked by identifying at least one power amplifier related to a thermal issue, and invoking thermal mitigation with respect to an active connection associated with the at least one power amplifier. One or more power amplifiers may be associated with each active connection. The different levels of thermal mitigation for the two active connections may be selected based on the association between at least one power amplifier of the apparatus and the subscription.

In an aspect, the apparatus may determine a type of the mitigation request and initiate a limited service mode at the wireless modem when the mitigation request is determined to have a highest priority type.

DETAILED DESCRIPTION

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

A system, a method and an apparatus are described. The apparatus may comprise a modem of a wireless telephony device that is adapted or configured to respond to a thermal mitigation request by selectively invoking thermal mitigation based on an identification of a source of the thermal issue, a subscription of the wireless device and/or an operational status of two or more connections maintained by the wireless device. In one example, the modem may implement thermal mitigation with respect to a first active connection and refrain from invoking thermal mitigation with respect to a second concurrently active connection maintained by the modem. The apparatus may determine the first and second active connections based on subscriptions corresponding to SIMs. The apparatus may identify a PA responsible for a thermal issue in the modem a PA, and/or the apparatus may identify a group of PAs that includes at least one PA responsible for a thermal issue in the modem. The decision to invoke mitigation on one connection and refrain from invoking mitigation on another connection may be based on whether one or both connections support data or voice traffic.

Figure 1:
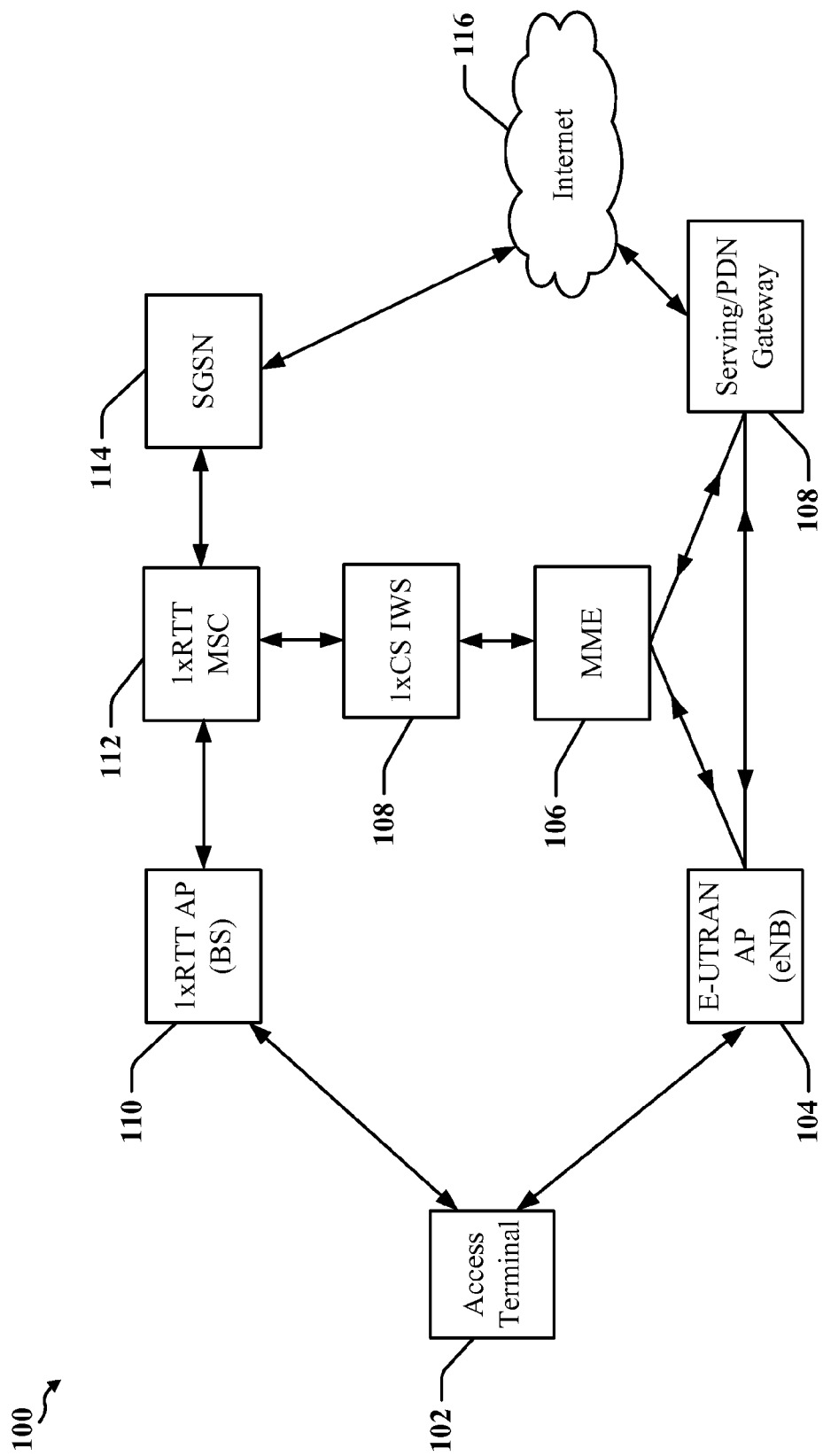
FIG. 1 is a block schematic illustrating an example of a network architecture.

FIG. 1 is a simplified diagram 100 illustrating a wireless networking environment. An access terminal 102 may be associated with one or more access points 104, 110. The access terminal 102 may comprise a cellular phone, a smart phone, a session initiation protocol (SIP) phone, a laptop computer, a personal digital assistant (PDA), a satellite radio, a global positioning system, a multimedia device, a video or audio streaming device, a video device, a digital audio player, a camera, a game console, a tablet, or any other similar functioning device. The access terminal 102 may be referred to as an access terminal, a mobile terminal, a wireless terminal, a remote terminal, a wireless terminal, user equipment, a user agent, a wireless device, a wireless communications device, a mobile device, a mobile wireless device, a mobile station, a subscriber station, a handset, a mobile client, a wireless client, or some other suitable terminology.

An access point 104 and/or 110 may comprise, or be referred to, as a base station, a base transceiver station, a radio access point, an access station, a radio transceiver, a basic service set, an extended service set, a Node B, an evolved Node B (eNB), or some other suitable terminology. Two or more access points 104 and 110 may be operated by the same or different network operators. Each access point 104, 110 may provide a radio interface in a radio access network (RAN) that provides access to core network services provided by one or more network operators. RANs may be implemented using any suitable radio access technology (RAT) and may be compatible or comply with telecommunication standards employing a variety of modulation and multiple access techniques. By way of example, RANs associated with access points 104, 110 may comprise one or more of Universal Terrestrial Radio Access (UTRA) employing code division multiple access (CDMA) or one of its variants, such as Wideband-CDMA (W-CDMA); Global System for Mobile Communications (GSM) employing TDMA, Time Division Synchronous Code Division Multiple Access (TD-SCDMA), Long Term Evolution (LTE) which is a set of enhancements to the Universal Mobile Telecommunications System (UMTS), Evolved UTRA (E-UTRA), IEEE 802.11 (Wi-Fi), IEEE 802.16 (WiMAX), IEEE 802.20, and Flash-OFDM employing OFDMA. RANs may also comprise one or more of Evolution-Data Optimized (EV-DO) or Ultra Mobile Broadband (UMB) networks.

In the example depicted, the access terminal 102 may be associated with a packet-switched (PS) network, such as LTE, through an eNB 104 and with a circuit-switched (CS) network for data and voice calls through a base station 110. The access terminal 102 may be registered with an E-UTRAN (through an eNB 104) and a packet data network (PDN) gateway 110 may provide connectivity between the access terminal 102 and one or more external packet data networks 116. The access terminal 102 may be registered with a 1xRTT CS network (which may be referred to as a 1x network) through a base station 110 in order to obtain voice and data services through a CDMA-2000 network, for example. In one example, a general packet radio service (GPRS) system permits 2G, 3G and W-CDMA mobile networks to transmit IP packets to external networks such as the Internet 116 using a gateway function which may comprise a serving GPRS support node (SGSN) 114. SGSN 114 may provide certain interworking services enabling communication between the GPRS system and external packet switched networks 116. Certain aspects of the invention are equally applicable to other combinations of PS and CS networks, including GSM for example.

In the example depicted in FIG. 1, the MME 106 serves as a control node for LTE traffic related to the access terminal 102. The MME 106 typically processes signaling between the access terminal 102 and a core network, providing bearer and connection management services. In some embodiments, an interworking server IWS 108 may perform a single radio voice call continuity interworking solution function. Accordingly, backhaul communications may be available between LTE and 1x networks. A mobile switching centre (MSC) 112 may control network switching elements used in the provision of 1xRTT voice services through 1xRTT base station 110.

An access terminal 102 may be deployed in a location where multiple accessible cells or RANs are available and the access terminal 102 may use different frequencies and/or different RATs to access a core network that provides mobility management, session management, transport for Internet Protocol (IP) packet services, and other services. RATs may be based on UMTS, TD-SCDMA, GSM, CDMA2000, WiMAX and LTE.

Figure 2:
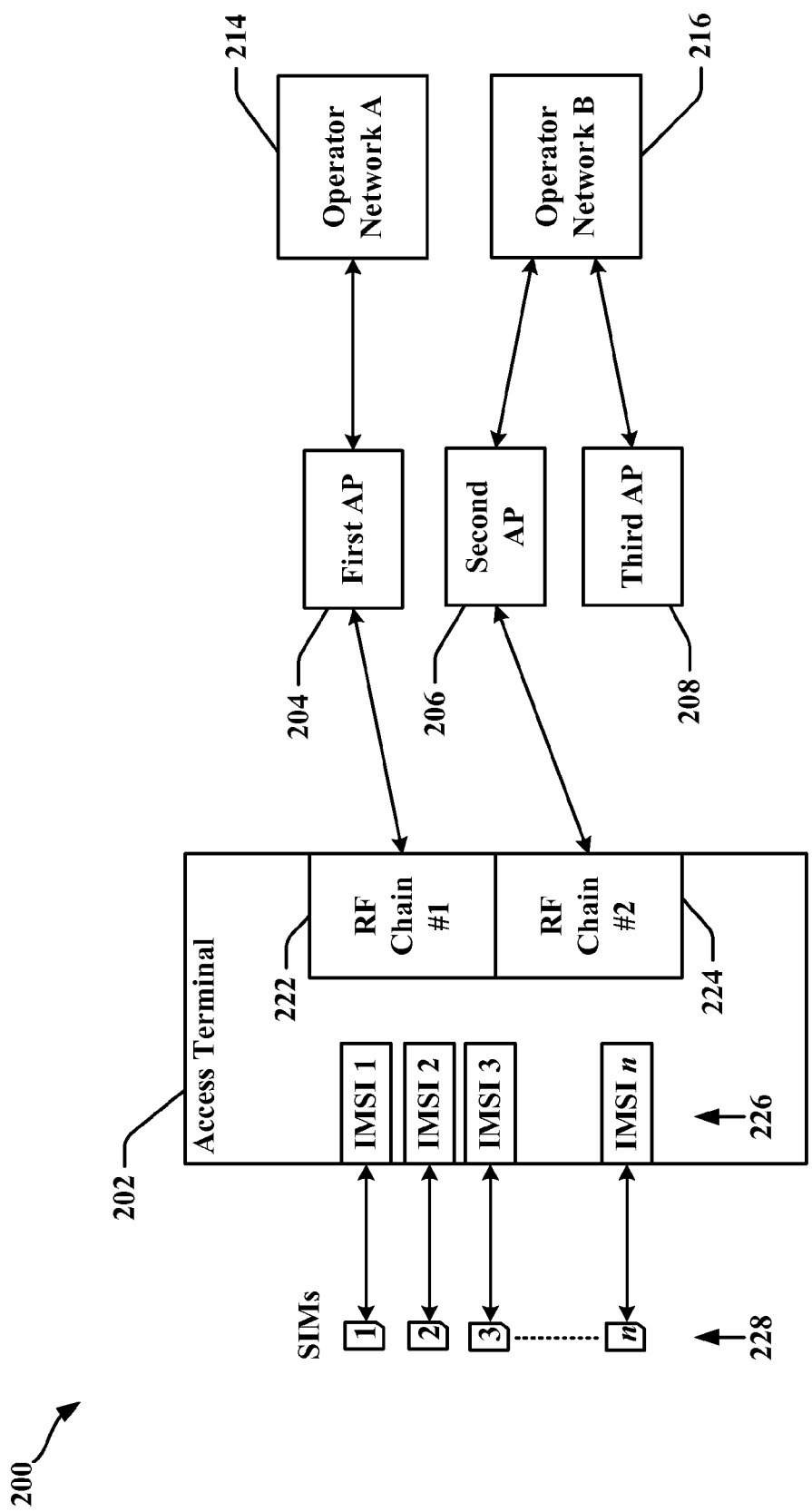
FIG. 2 is a block schematic illustrating operation of an access terminal

FIG. 2 is a diagram illustrating an access terminal 202 adapted to operate concurrently in multiple networks. The access terminal 202 may receive services provided by one or more core networks 214 and 216. The access terminal 202 may communicate with a first access point 204 to obtain services from a first network 214 and with a second access point 206 to obtain services from a second network 216. An access terminal 202 may obtain services from a single network through two or more access points 204, 206 and/or 208. For example, an access terminal 202 may communicate with second access point 206 and a third access point 208 to obtain services from second network 216. In another configuration, an access terminal 202 may communicate with a third access point 208 or another access point to obtain services from a third network (not shown). Each network 214 and 216 may provide voice and/or data services through one or more RANs operated by the same or different network operators.

An access terminal 202 may be adapted or configured to support two or more SIMs 228 that can be used to identify and authenticate subscribed users of the different services offered by operators on networks 214 and/or 216. In one example, each SIM 228 may store an international mobile subscriber identity (IMSI) and related keys that can uniquely identify and authenticate a user of the access terminal 202 and subscribed services available to the user through networks 214 and/or 216. Each SIM may be associated with a telephone number or other network identifier different from telephone numbers or other identifiers associated with the other SIMs. In the illustrated example, an access terminal 202 may comprise a mobile telephone device equipped with two SIM cards 208 and 210 that enable the establishment of calls on two different voice and/or data networks. An access terminal 202 may maintain two or more concurrent active calls. The use of multiple SIM cards 208 and 210 may permit a user of an access terminal 202 to access and use features of different subscriptions to reduce costs, obtain superior service, etc.

An access terminal 202 may support a variety of multiple SIM operational modes. For example, in dual SIM stand-by (DSS) mode, the access terminal 202 may initially be in standby mode for two different subscriptions. After establishing a call through one RAN 214 or 216, the access terminal 202 may cause the connection between access terminal 202 and the other RAN 216 or 214 to enter an inactive state.

In DSDA mode, the access terminal 202 may be concurrently connected to two networks 214 and 216 and/or to a single network 214 or 216 through two connections. A DSDA-enabled access terminal 202 may be capable of switching between two active calls and/or connecting two active calls at the access terminal 202. In DSDA mode, the access terminal 202 may establish a first active call on a first network 214, while remaining idle on a second network 216. While a call is active on a first subscribed network 214 or 216, a DSDA-enabled access terminal 202 may receive a second call through a second subscribed network 216 or 214. If calls are active on the first and second subscribed networks 214 and 216, a user may switch between the two calls as desired, and/or may connect the two calls at the access terminal 202. Access terminal 202 may support more than two SIMs 228 and other modes of operation may be defined accordingly, including triple SIM dual active (TSDA) mode, quad SIM dual active (QSDA) mode, and so on.

An access terminal 202 that is adapted or configured for multi-SIM, multi-active mode may comprise a plurality of radio frequency (RF) chains 222 and 224. The number of RF chains 222 and 224 provided in the access terminal 202 may determine the number of concurrently active calls that can be supported by the access terminal 202. Each RF chain 222 and 224 may be assigned for establishing and maintaining an active connection with an access point 204, 206, or 208. The plurality of RF chains 222, 224 may be embodied in one or more RF modems. An RF modem may comprise one or more RF chains 222, 224, each having at least one PA. In the example depicted in FIG. 2, access terminal 202 may employ two RF chains 222, 224 to support concurrent connections to different access points 204 and 206 corresponding to networks 214 and 216, respectively. An RF modem may additionally comprise one or more processors, non-transitory storage and logic configured to process, transmit and receive signals, and to encode and decode data transmitted and received by the access terminal 202.

Figure 3:
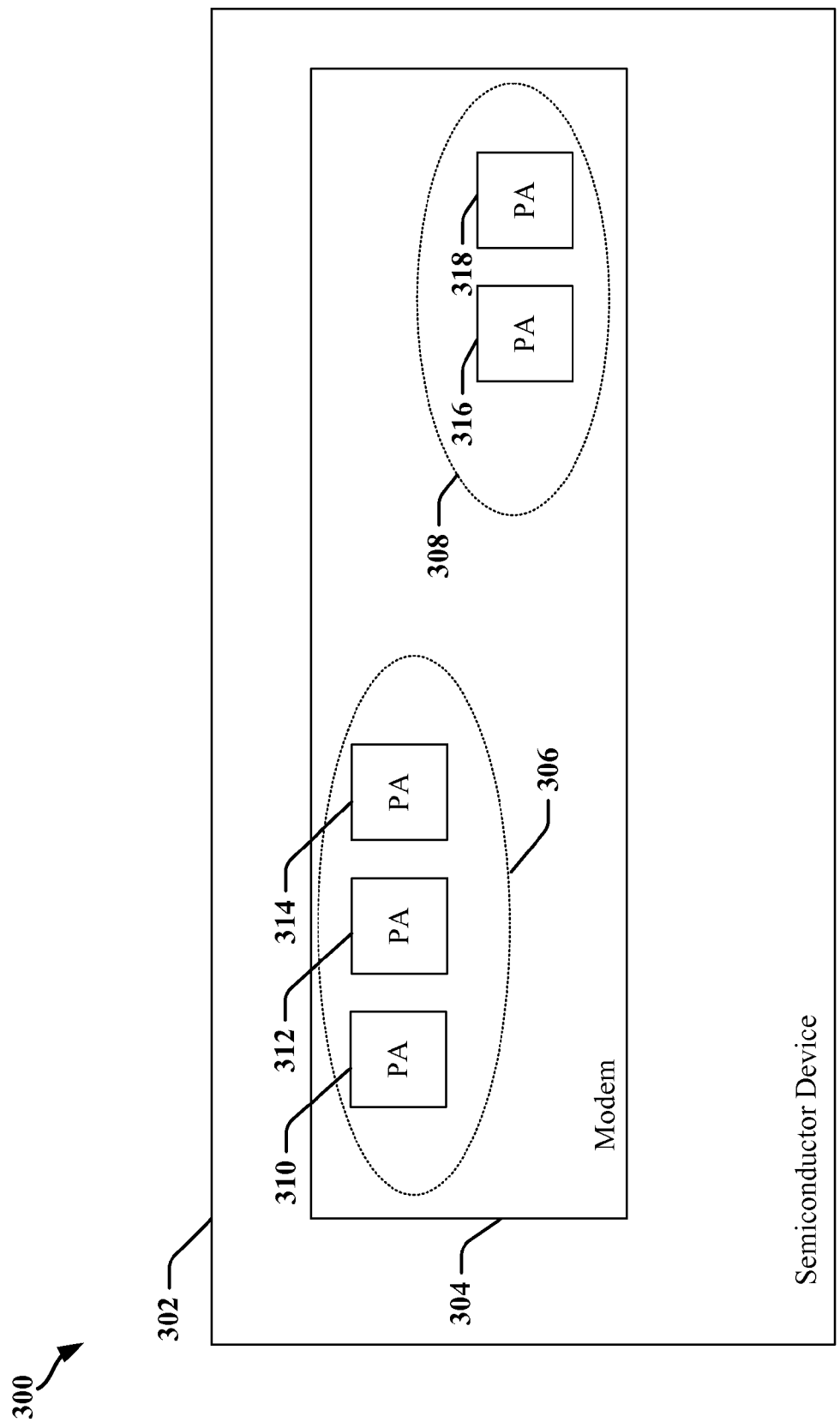
FIG. 3 is a diagram illustrating a first example of power amplifier distribution in a semiconductor device.

FIG. 3 is a simplified schematic representation 300 of a semiconductor device 302 illustrating positioning of certain components of an RF modem 304. RF modem 304 may include a plurality of PAs 310, 312, 314, 316, and 318. Each PA 310, 312, 314, 316, and 318 may be configured to operate in a subband of bandwidth allocated to a network connection. PAs 310, 312, 314, 316, and 318 may be assigned to different PA groups 306 and 308, which may correspond to physically separated RF chains assigned to handle communications for different wireless connections. In one example, RF chains 222, 224 may be assigned to connections based on network subscriptions identified by SIMs 228 installed in an access terminal 202. In some embodiments, PA groups 306 and 308 are disposed in physically separate locations of the modem 304 or device 302. PA groups 306 and 308 may be separated by thermally and/or electrically significant distances such that thermal heating contributions of the two or more groups 306 and 308 may be distinguishable using thermal sensors. Thermal sensors may be deployed within a substrate or package of the semiconductor device 302, on a die on which on which the modem is formed, and/or on a chip carrier.

Figure 4:
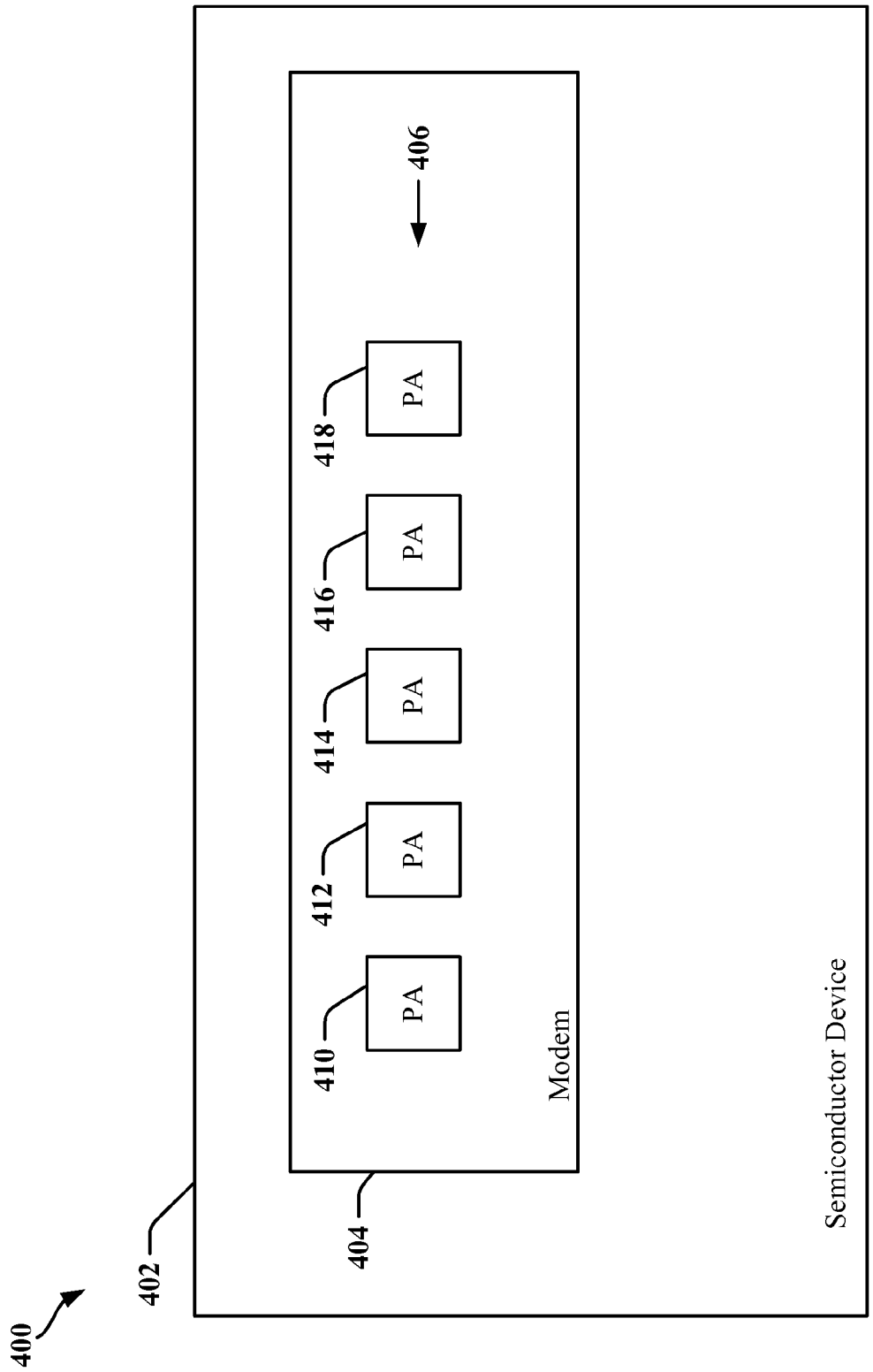
FIG. 4 is a diagram illustrating a second example of power amplifier distribution in a semiconductor device.

FIG. 4 is a simplified schematic representation 400 illustrating a device 402 that comprises an RF modem 404. RF modem 404 may include a plurality of PAs 410, 412, 414, 416 and 418, and each PA may be configured to operate in one or more subbands of bandwidth allocated for use in a network connection. In this example, PAs 410, 412, 414, 416 and 418 may be clustered within, or dispersed across a region of the modem 404 such that groups of PAs 410, 412, 414, 416 and 418 allocated for use with different RF chains are not separated from one another by significant distances. In one example, PAs 410, 412, 414, 416, and 418 may be individually assigned to a subband of frequencies, a network connection and/or a subscription identified by a SIM. PAs 410, 412, 414, 416, and 418 may be assigned by a designer of the device and, in at least some embodiments, one or more PAs 410, 412, 414, 416, and 418 may be allocated by the modem 404 based on current operational needs of the modem 404 related to connection to different RANS.

With continued reference to FIGS. 2, 3 and 4, modems 304 and 404 may be components of an access terminal 202 that is configured or adapted to respond to thermal mitigation requests or commands. Thermal mitigation requests may be used to control power usage by a modem 304 or 404 in order to reduce temperatures within the access terminal 202, and/or to avoid further temperature increases in an integrated semiconductor device 302 or 402, and/or within a package that carries semiconductor device 302 or 402. Elevated temperatures can cause malfunction and damage to the semiconductor device 202, 252 or to other devices collocated with semiconductor device 302 or 402. In one example, power may be controlled using gain control circuits to limit signal output power. In another example, power may be controlled using circuits that divide clock signals or otherwise slow processor instruction cycles or control logic clocking rates.

Response to thermal mitigation commands may be varied and may be based on priorities assigned to the thermal mitigation requests. For example, a modem 304 or 404 may be configured or adapted to respond to thermal mitigation requests or commands and may reduce power usage by modifying a transmitter power, modifying a processing clock speed, modifying a modulation scheme, implementing data flow control to reduce transmission rate, and/or by modifying another operational feature or characteristic of the modem 304 or 404. For higher priority thermal mitigation requests, power usage may be further reduced by terminating one or more connections, suspending one or more connections, and/or by transitioning a connection from active to idle state.

In conventional systems, an RF modem 304 or 404 is viewed as a single functional element from a thermal mitigation perspective, and thermal mitigation requests are sent with the intent that power consumption of all elements of a modem 304 or 404 is to be controlled. However, in a multi-SIM access terminal 202, the modem 304 or 404 may include multiple RF chains 222 and 224, where one RF chain 222 or 224 may be a source of a thermal issue while another RF chain 224 or 222 is not contributing significantly to the thermal issue.

In certain embodiments, thermal mitigation may be selectively applied such that thermal mitigation may be deferred for any of RF chains 222 and/or 224 associated with a connection that has low thermal risk, while power reduction and other thermal mitigation procedures are executed for RF chains 224 and/or 222 that are expected or known to produce significant thermal issues. For example, a GSM/EDGE/GPRS connection may be associated with a relatively small risk of causing thermal issues in an access terminal 202 and optimal thermal mitigation may be obtained by addressing an RF chain 222 or 224 that is used for connections which employ technologies that are more likely to cause thermal issues. Thermal issues may be resolved by addressing fewer than all technologies when multiple wireless connections are active, rather than requiring all modem technologies to comply with thermal mitigation requests. Consequently, at least some functions of the access terminal 202 may be maintained, even when dealing with severe thermal mitigation issues.

Thermal mitigation schemes and protocols typically require a modem 304, 404 to execute the mitigation level based on the assumption that the modem has already been tagged as the likely culprit of a detected thermal problem. According to certain aspects disclosed herein, a thermal mitigation request may be executed only with regard to the technology or technologies relevant to the thermal problem, in proportion to the contribution of the technology or technologies to the thermal problem and/or based on the operational status of active connections.

Certain embodiments employ systems and methods that can discern the contributions of components and circuits in an integrated modem 304 or 404 to thermal issues based on the active RATs concurrently supported by the components and circuits. Different thermal mitigation techniques may be applied to the components and circuits based on their respective individual contributions to an identified thermal problem. Individual contributions of components and circuits to thermal issues may be attributable in part to active calls established and maintained on the RATs supported by the components and circuits. In contrast, conventional modems expect and/or require that all components and circuits associated with different concurrent active technologies comply with mitigation requests, even if one or more of the technologies is not a significant contributor to the identified thermal problem.

Certain embodiments enable a graduated approach to thermal mitigation by prioritizing reduction of power consumption according to activities associated with different subscriptions supported by an access terminal 202. A modem 304, 404 in an access terminal 202 may be configured to discern different contributions of components and circuits associated in an integrated modem 304 or 404 based on current operational status of the components and circuits. A modem 304, 404 in a DSDA-enabled access terminal 202 may be treated as a plurality of distinct entities that operate somewhat independently, and the modem 304, 404 may be configured to control power usage and activities of the components and circuits independently of one another to at least some thermal mitigation commands directed to the modem 304, 404.

In one example, one or more components and circuits of a modem 304, 404 may be used in association with a voice connection through a network 114 or 116, and the modem 304, 404 may handle the one or more components and circuits differently from components of the modem 304, 404 that are associated with a data connection through a network 116 or 114. The modem 304 or 404 may apply levels of power reduction to components and circuits associated with a voice call that are different from the levels of power reduction applied to components and circuits associated with a data call in response to a thermal mitigation command.

The modem 304 or 404 may treat one of a data call and a voice call differently from the other in response to a thermal mitigation command. In one example, the modem 304 or 404 may initiate thermal mitigation for data services provided on a first network connection through scheduling and data rate reduction, while delaying power mitigation for an active voice call on a different network connection. In another example, an "on-hold" call on a first subscribed network 114 or 116 may be dropped in response to a thermal mitigation command, while an active call on a second subscribed network 116 or 114 may be maintained.

With continued reference to FIGS. 2-4, the access terminal 202 may monitor temperatures in certain areas of a semiconductor device 302, 402. In an integrated circuit, die or package, the monitored temperatures may be proximate to predefined thermal zones that include groups of components and circuits 306, 308 and 406. Each group of components 306, 308 and 406 may be associated with a single subscription. For example, a DSDA-enabled access terminal 202 may comprise separate RF chains 222 and 224 that may be individually assigned for use with one of a plurality of SIMs 228 installed in the access terminal 202. Each RF chain 222, 224 may include one or more PA groups 306 and/or 308, or one or more of available PAs 310, 312, 314, 316, 318, 410, 412, 414, 416 and/or 418. Each PA 310, 312, 314, 316, 318, 410, 412, 414, 416 and/or 418 may operate in a band of frequencies used by the modem for communications over a corresponding connection in a subscribed RAN. In some embodiments, one or more temperature sensors may be placed in the vicinity of PA groups 306 or 308 or near to individual PAs 310, 312, 314, 316, 318, 410, 412, 414, 416 and/or 418. The modem 204 may maintain information associating PAs 310, 312, 314, 316, 318, 410, 412, 414, 416, 418, and/or PA groups 306, 308 with an RF chain 222, 224 that is mapped to a subscription associated with one of the SIMs 228. In one example, the temperature sensors may comprise one or more thermistors integrated into the modem circuitry, attached to a die, provided in a package, or otherwise deployed relative to an integrated circuit carrying the modem.

Figure 5:
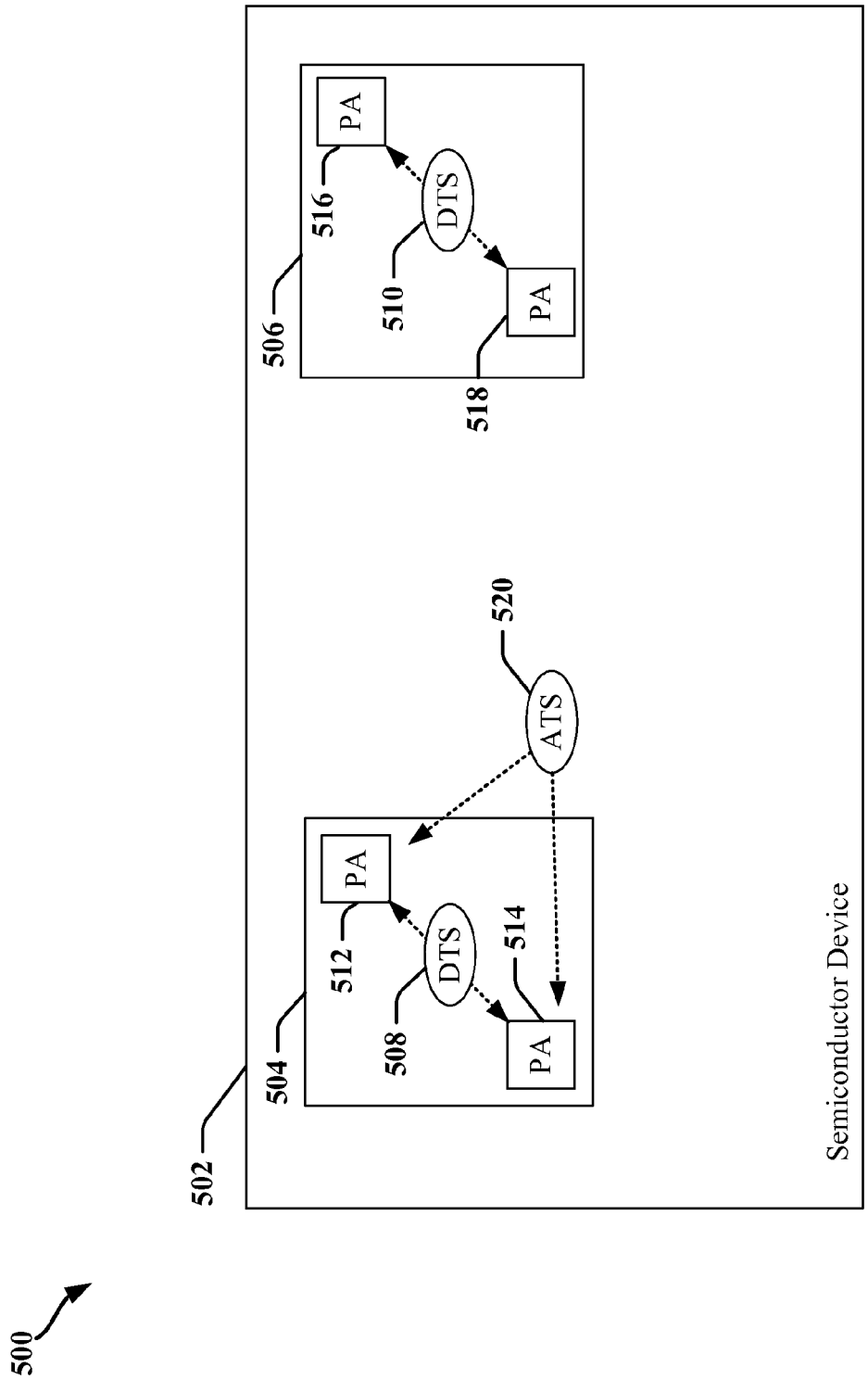
FIG. 5 is a diagram illustrating a first example of thermal sensor distribution in a modem.

FIG. 5 is a schematic diagram 500 illustrating a semiconductor device 502 in which a plurality of thermal zones 504 and 506 are defined. Thermal zones 504 and 506 may comprise sections and areas within an IC, a package, or an apparatus in which thermal issues are monitored and controlled. Thermal zones 504 and 506 may coincide with physical groupings of components and circuits that are likely to become a source of thermal issues. In one example, a thermal zone 504 may be associated with a grouping of components and circuits corresponding to an RF chain 222 or 224 that comprises PAs 512 and 514, while another thermal zone 506 may be associated with a grouping of components and circuits corresponding to an RF chain 222 or 224 that includes PAs 516 and 518. More than one thermal zone 504 and 506 may be associated with a single RF chain 222 or 224.

One or more temperature sensors 508, 510 and/or 520 may be deployed to monitor temperatures in each thermal zone

504, 506. A dedicated temperature sensor (DTS) 508, 510 may be deployed in or near each thermal zone 504, 506 such that the DTS 508, 510 may monitor a likely source of thermal issues, such as PA 512, 514, 516 or 518. Each DTS 508, 510 is typically located in close proximity to its target (e.g., one of PA 512, 514, 516 or 518). Temperatures of PAs 512, 514, 516 and/or 518 can be used to determine the contribution of PAs 512, 514, 516 and/or 518 to a thermal issue in a semiconductor device 502 or package. A DTS may comprise a plurality of thermal sensors, each configured to monitor one of PA 516 or 518.

An associated temperature sensor (ATS) 520 may be provided to monitor temperature in a thermal zone 504 or 506. An ATS 520 may be provided in addition to, or in place of DTS 508. An ATS 520 may be configured to measure temperatures of a plurality of PAs 512 and 514 and/or the effect of PAs 512 and/or 514 on a thermal zone 504. Accordingly, an ATS 520 may be located at a distance from a likely source of thermal issues in order to monitor a temperature associated with a plurality of components in or around the thermal zone 504, and/or to measure temperature in an area that may detrimentally affect operation of one or more components or circuits that are not a source of increased temperatures.

Figure 6:
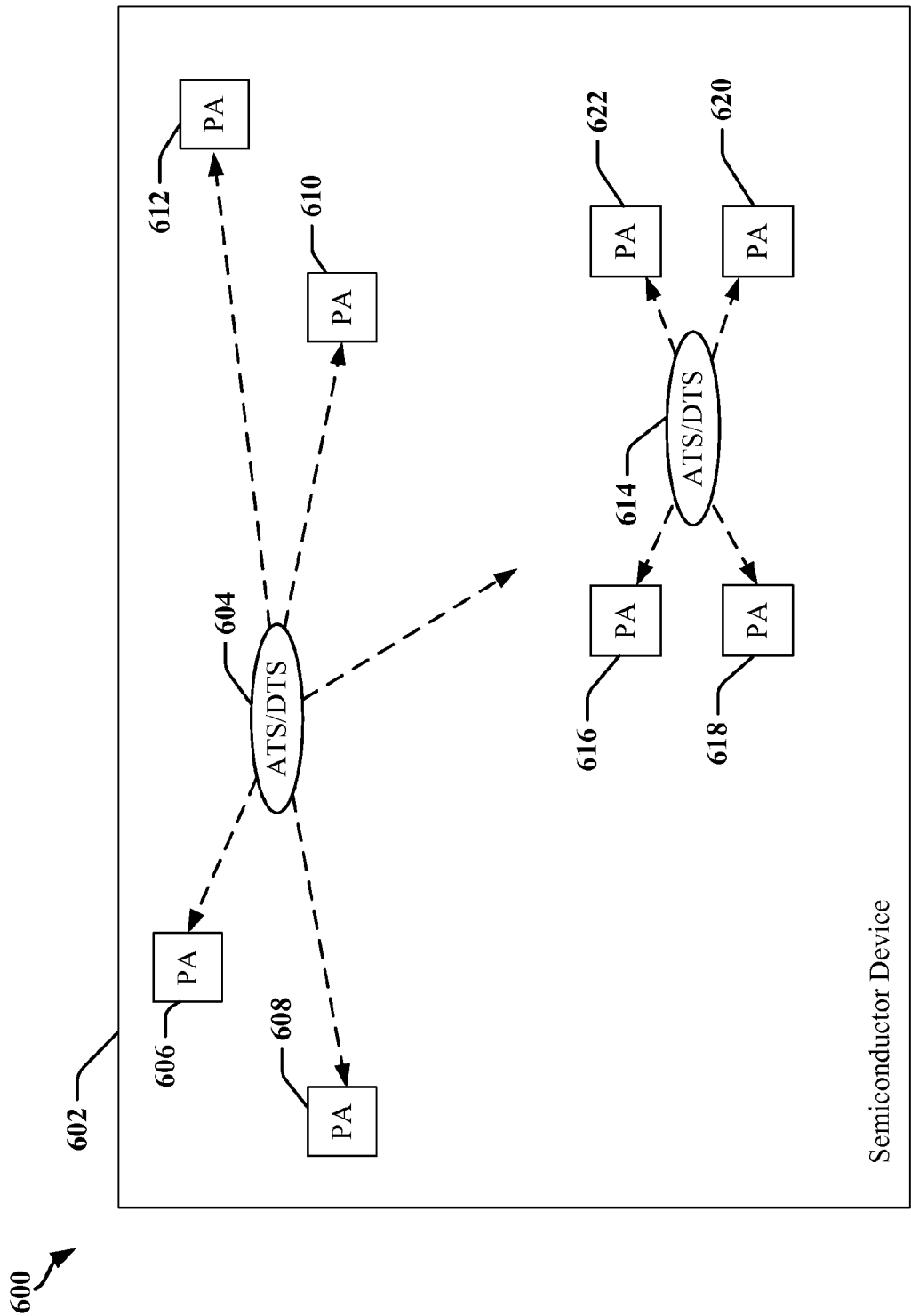
FIG. 6 is a diagram illustrating a second example of thermal sensor distribution in a modem.

FIG. 6 is a schematic diagram 600 illustrating a semiconductor device 602 in which a single thermal zone is defined. The thermal zone may comprise the entire semiconductor device 602, or a portion of the semiconductor device 602. In some embodiments, the thermal zone comprises at least a portion of a modem that includes components and circuits corresponding to one or more RF chains 222 and/or 224. As depicted, PAs 606, 608, 610 and 612 are dispersed throughout an area of the semiconductor device 602, while PAs 616, 618, 620 and 622 are clustered in proximity to one another. In some embodiments, all PAs 606, 608, 610, 612, 616, 618, 620 and 622 may be clustered in one or more groups or dispersed throughout a given area. Typically, one group of sensors 604, 614 comprising at least one ATS and/or DTS is used to monitor temperatures within the single thermal zone. A plurality of sensors 604 and 614 may be deployed based on the topography, layout, density and/or other attributes of semiconductor device 602.

In certain embodiments, different thermal mitigation procedures may be implemented in different thermal zones 504, 506 in a modem. In some embodiments, different thermal mitigation procedures may be implemented individually with respect to components or circuits found in a thermal zone. In one example, different thermal mitigation processes may be applied to RF chains 222 and 224 in a DSDA-enabled access terminal 202 based on priority of a thermal mitigation request, RATs associated with the RF chains 222 and 224, and the type and status of calls established on RF chains 222 and 224.

Different thermal mitigation processes may be implemented in a DSDA-enabled access terminal 202 based on measured temperatures of one or more PAs 310, 312, 314, 316 and/or 318. With continued reference to FIGS. 2-6, a modem 304, 404 may comprise a plurality of RF chains 222 and 224, each RF chain 222 and 224 having at least one PA 310, 312, 314, 316 and/or 318. A processing device of an access terminal 202 may obtain and monitor temperature measurements from one or more sensors, such as ATS 520 and DTS 508 and/or 510. Upon receipt of a thermal mitigation request, the temperature measurements may be examined to determine a potential source of the thermal issue. The potential source may be one or more individual PAs 310, 312, 314, 316 and/or 318. The potential source may be identified as one or more groups of components, such as PAs 310, 312 and 314 and/or PAs 316 and 318. The potential source may be identified as residing in one or more thermal zones 306 and/or 308.

Different thermal mitigation processes may be performed on different elements of a modem when one or more components, circuits, groups of components or circuits, and/or thermal zones 306, 308 can be identified as a potential source for a thermal issue. For example, when a PA 310, 312, 314, 316 or 318 is targeted as a potential contributor to a thermal issue in the modem, then thermal mitigation may be applied to the RF chain 222 or 224 to which the targeted PA 310, 312, 314, 316 or 318 belongs or is assigned, while thermal mitigation is not applied to other RF chains 224 or 222. Thermal mitigation may be applied to an RF chain 222 or 224 by reducing power provided to the RF chain 222 or 224, terminating or suspending a wireless connection supported by the RF chain 222 or 224, and/or by implementing flow control on a connection supported by the RF chain 222 or 224.

In one example, gain control logic may be configured to reduce transmission power of one or more RF chains 222, 224, thereby directly controlling power output and associated heat generation attributable to the inefficiency of amplifiers and other circuits. In another example, power consumption and associated heat generation may be a function of frequency of operation of the circuit and reductions may be achieved by slowing the clocking rate of the circuit. In another example, limits placed on data throughput can reduce the percentage of time that an RF chain 222 or 224 is transmitting and the introduction of flow control may be effective in reducing temperature increases if generated heat can be efficiently dissipated.

In some embodiments, the decision on whether to apply thermal mitigation to an RF chain 222 or 224 may be taken based on nature and/or type of a subscription associated with the RF chain 222 or 224. According to certain aspects described herein, a thermal zone may be assigned based on one or more of (i) structures of each group of PAs 310, 312, 314, 316 or 318, (ii) physical locations of the PAs 310, 312, 314, 316 or 318, and (iii) a subscription associated with the PAs 310, 312, 314, 316 or 318. Further associations may be established between thermal sensors 508, 510 and 520, thermal zones 504, 506 and subscriptions. Typically, at least one thermal sensor 508, 510 and/or 520 may be assigned to each thermal zone 504, 506. Subscription-specific thermal mitigation may then be established within the modem. Subscription-specific thermal mitigation may result in different responses to different levels of thermal mitigation commands. However, in at least some embodiments, the thermal mitigation response for all subscriptions of the modem may be the same for certain high-priority commands. For example, a "Level 3" command may be defined to represent a crisis situation or to otherwise command a level of urgency in response to the thermal mitigation request. Response to a Level 3 command may result in initiation of a limited service mode for all subscriptions, whereby limited modem activity and only emergency calls are permitted until the temperature crisis is abated.

In certain DSDA-enabled access terminals 202, all PAs 410, 412, 414, 416 or 418 may be grouped in a one or more thermal zones and different responses to thermal mitigation commands may be implemented for different subscriptions based on configuration and current status of the modem with respect to each subscription. In one example, a voice call may be established on one of the subscriptions, while a data and/or voice connection is active on the other subscription. Typically, thermal mitigation is applied to data calls initially, because a data call is typically established with a lower quality-of-service requirement that a time-sensitive voice call. In another example, data and voice calls may be concurrently active on a subscribed data network when a voice-over-Internet Protocol (VoIP) call is established on the data call. A VoIP call may transform quality-of-service requirements of a data connection based on a change of traffic characteristics from time-insensitive to time-sensitive communication. In another example, data-only connections may be active on two subscribed networks and differentiated thermal mitigation may be applied to the connections based on other factors, such as operator preferences and/or negotiated quality-of-service. Negotiated quality-of-service and operator preferences may also be used to prioritize video, voice and other high priority, time sensitive calls for application of thermal mitigation.

In certain embodiments, a modem may comprise PAs 310, 312, 314, 316 and/or 318 that can be assigned at different times to different modem technologies. Accordingly, certain embodiments may determine, access, or maintain information that identifies which modem technology is currently served by a PA 310, 312, 314, 316 or 318. A mapping of PAs 310, 312, 314, 316 and/or 318 to modem technology may be maintained and updated when, for example, an inter-RAT (IRAT) handoff or reselection occurs. For thermal mitigation purposes, the modem may identify the active PAs 310, 312, 314, 316 and or 318 that are present in a thermal zone 306, 308 and/or which active modem technologies associated with a thermal zone 306, 308 are a likely source of a thermal issue, when the thermal zone 306, 308 is tagged as the location of the thermal issue. Thermal mitigation for the tagged thermal zone 306, 308 can then be implemented based on an assumption that a thermal issue in the thermal zone 306, 308 can be mitigated primarily by managing active PAs 310, 312, 314, 316 and/or 318 and active modem technologies associated with the tagged thermal zone 306, 308.

With reference to FIGS. 2 and 5, a DSDA-enabled access terminal 102 may be configured with a first PA group comprising PAs 512 and 514 assigned to a first thermal zone 504, and a second PA group comprising PAs 516 and 518 assigned to a second thermal zone 506. The first thermal zone 504 and the second thermal zone 506 may be located at different physical locations in semiconductor device 502. In one example, the two thermal zones (Z (n), where n=1:2) are monitored using a set of one or more DTS devices 510 allocated for one thermal zone 506 and a set of one or more ATS devices 520 allocated for the other zone 504. Thermal issues may be attributed to subscriptions based on temperature measurements obtained by ATS devices 520 and/or DTS devices 510. In another example, the two thermal zones are monitored using a set of one or more DTS devices 508 allocated for one thermal zone 504 and a set of one or more DTS devices 510 may be assigned to the other zone 506. Thermal issues may be attributed to subscriptions based on temperature measurements obtained by any combination of DTS devices 508 and 510.

When a modem of DSDA-enabled access terminal 202 comprises PAs 512, 514, 516, and 518 that are deployed across two thermal zones 504 and 506 centered in two distinct and different physical locations, the response to thermal mitigation requests or commands may be zone-based. In particular, a subscription associated with a thermal zone 504 or 506 identified as a source of the thermal issue may comply with the thermal mitigation request, while a thermal zone 504 or 506 that is not tagged as a source of the thermal issue may ignore at least some thermal mitigation requests. When both thermal zones 504 and 506 are identified as sources of the thermal issue, both subscriptions typically comply with the thermal mitigation request such that all voice calls and data calls comply with thermal mitigation request when both thermal zones 504 or 506 are identified as a source of the thermal issue.

With reference to FIGS. 2 and 6, only one thermal zone (Z(1)) may be defined in a modem of a DSDA-enabled access terminal 202. Some or all of PAs 606, 608, 610, 612, 616, 618, 620 and/or 622 may be dispersed across the thermal zone and a set of ATS and/or DTS devices 604 may be allocated for the entire zone. In this example, attribution of a thermal issue to a subscription may be made by some combination of thermal measurements received from ATS/DTS devices 604 and/or operational characteristics of each connection to the subscribed networks 214 or 216. A plurality of 616, 618, 620 and 622 may be clustered in the thermal zone and a set of ATS and/or DTS devices 614 may be provided for the cluster of PAs 616, 618, 620 and 622. In this example, attribution of thermal issue to subscription may be made by some combination of thermal measurements received from ATS/DTS devices 614, thermal measurements received from ATS/DTS devices 604, and/or operational characteristics of each connection to the subscribed networks 214 or 216.

The response to mitigation requests may be based at least in part on the operational characteristics and/or status of a subscribed network 214 or 216. When both subscriptions are associated with voice calls, only the afflicted voice need comply with the thermal mitigation request. Data connections are typically more likely to cause thermal issues and, data mitigation responses may be initially directed to the data connection.

A modem may determine how a thermal mitigation request is handled. In particular, the modem may initially identify thermal zones having thermal issues, determine associations between thermal zones and subscriptions, and determine associations between currently active radio technologies and subscriptions. The modem may then determine the response required of each thermal zone based on a thermal mitigation level. A thermal mitigation level may be defined independently for each thermal zone and may be further based on a determination of the zone or technology that is most likely the source of the thermal issue.

Figure 7:
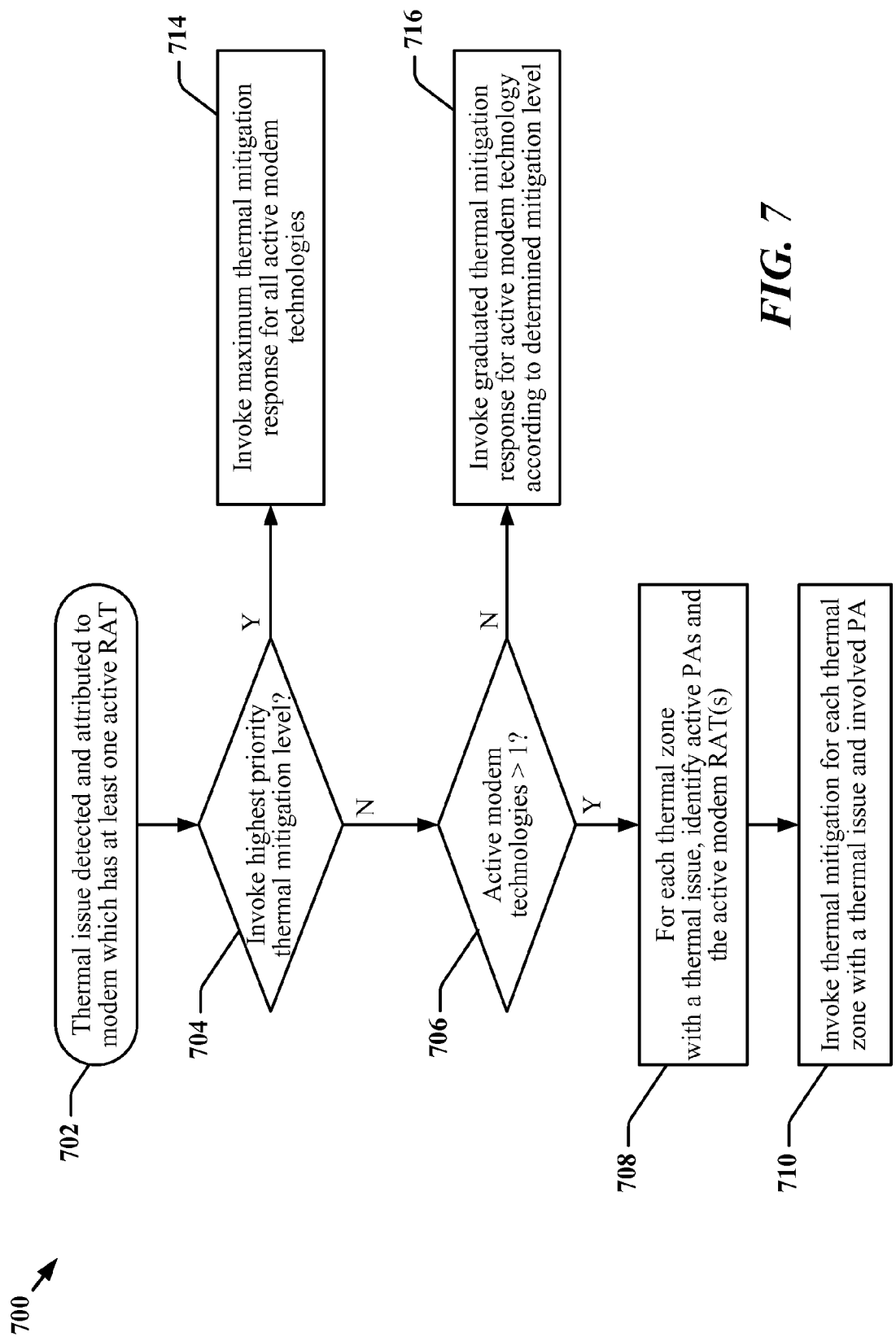
FIG. 7 is a flow chart of a method of thermal mitigation.

FIG. 7 is a modem-level flowchart illustrating an example of a process for responding to a thermal mitigation request. The process may be initiated at step 702 when a thermal issue is identified and attributed to a modem that supports connections using one or more RATs. The modem maybe configured to respond to a plurality of different thermal mitigation requests. A thermal mitigation request may request specific thermal mitigation actions, and/or which may identify a priority or other indication of a level of severity of the thermal issue. For example, mitigation requests may identify a current level associated with a thermal issue enabling a selective and/or graduated response by the modem. A modem may be configured to respond to thermal mitigation requests that are associated with a level that ranges between 0-10, with level 0 indicating that no thermal issue is identified and level 10 requiring immediate and maximum response. For the purposes of this example, 4 levels of thermal mitigation request priority are defined. However, any number of levels can be associated with thermal mitigation requests.

At step 704, the modem may determine whether the request comprises a highest priority request. In the example, in which 4 levels of thermal mitigation request priority are defined, the levels range from level 0 up to a level 3 thermal mitigation level request, whereby level 0 indicates that no thermal issue is identified and where level 3 may be issued if a crisis situation has developed. If the thermal mitigation request is determined to have a highest priority level (e.g., a level 3 request), then at step 714 the modem may cause all active technologies to comply with the mitigation request. Typically, the modem takes immediate and/or stringent action calculated to combat the thermal issue.

If the mitigation request has a priority level lower than the highest priority, then at step 706 the modem may determine the number of currently active RATs. If only one RAT is active, then at step 716 the modem may invoke thermal mitigation as appropriate for the priority level of the thermal mitigation request.

If more than one RAT is active, then the modem may identify active PAs and corresponding active RATs at step 708. Different levels of thermal mitigation may be applied for each active connection, and the modem may refrain from applying thermal mitigation for some active connections. At step 710, the modem may invoke thermal mitigation for each thermal zone identified as having a thermal issue. Invoking thermal mitigation for a thermal zone may include invoking thermal mitigation for one or more PAs in the thermal zone.

Figure 8:
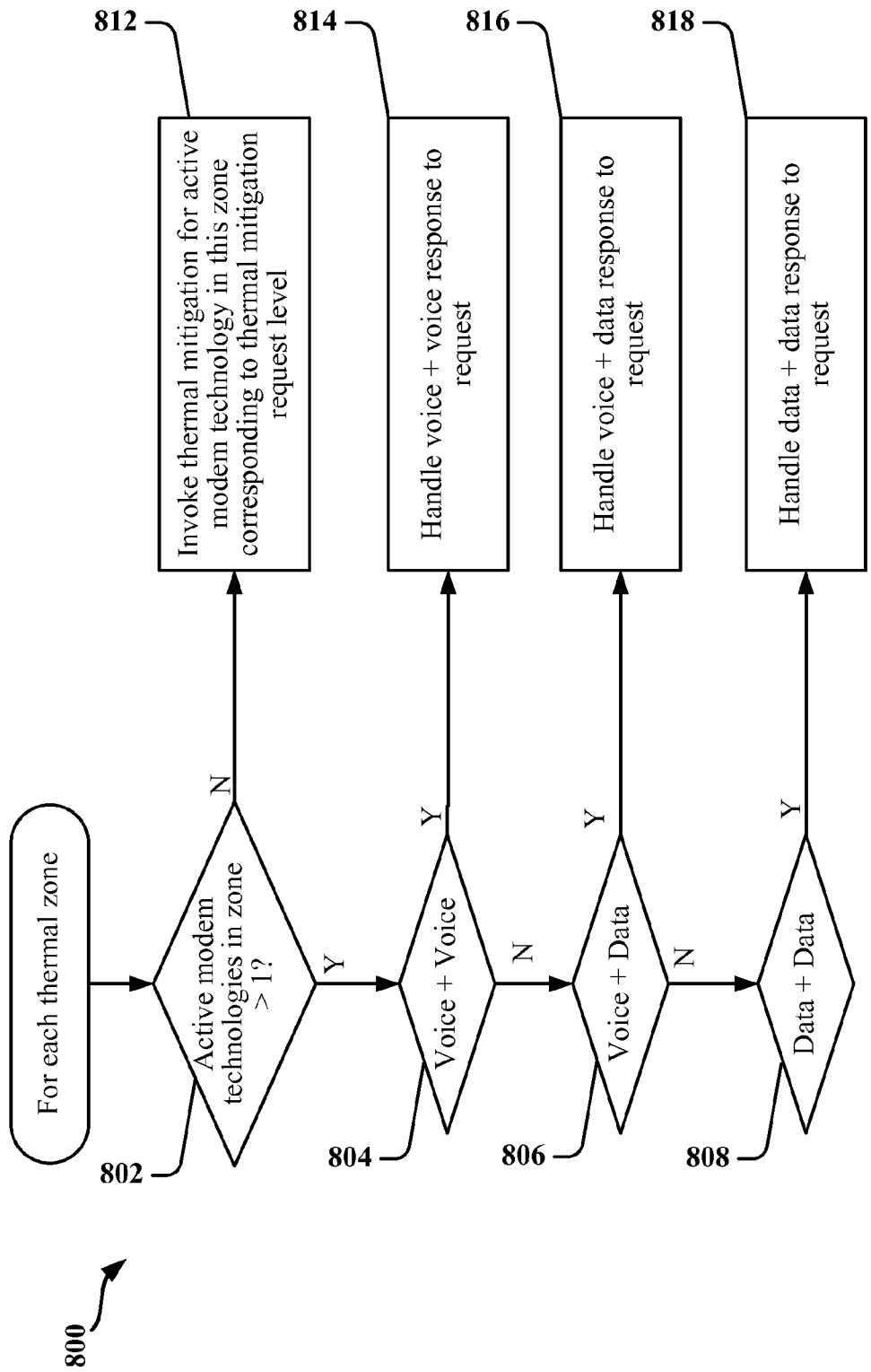
FIG. 8 is a flow chart of an example of a method of thermal mitigation when one or more thermal zones are defined on a semiconductor device.

FIG. 8 is a flowchart illustrating a process for responding to a thermal mitigation request in each thermal zone of a modem. At step 802, the modem may determine the number of active RATs in the thermal zone. If only one active RAT is determined to be supported in the thermal zone, then at step 812 the modem may invoke thermal mitigation in response to the priority level of the thermal mitigation request (e.g., first and second level mitigation requests).

At step 804, the modem may determine whether each of two active RATs involve voice calls and, if both RATs involve a voice call, the modem may invoke a dual voice response to the thermal mitigation request at step 814. In an example, the dual-voice response may be based on a determination of which calls are currently active, on-hold, or idle and/or may be based on a determination of call and/or RAT priorities.

At step 806, the modem may determine whether the two active RATs involve both voice and data calls. If both voice and data calls are active, the modem may invoke a response to the thermal mitigation request appropriate for voice and data calls at step 816. In an example, the response may leave the voice call unaffected, while causing a reduction in power used for the data call. In another example, the response may be based in part on whether the data call includes a VoIP connection; if a VoIP call is in progress, thermal mitigation may follow a dual-voice response at step 814 and be based on a determination of which voice calls are currently active, on-hold, or idle and/or may be based on a determination of call and/or RAT priorities.

At step 808, the modem may determine whether both of the two active RATs involve data calls and, if so, the modem may invoke a response to the thermal mitigation request appropriate for dual-data connections at step 818. In an example, the response may cause one of the data calls to reduce power consumption if the other data call includes a VoIP connection. In another example, the mitigation response may be based on a determination of quality of service, RAT priority, operator preference, and other factors.

Responses to thermal mitigation requests may be defined based on attribution of thermal issues by subscription, by thermal zone and/or by call type. For the purposes of illustration, a subscription-based response is now described which may be used when a modem has a single thermal-zone. When two active RATs are detected and when both calls involve voice calls, the modem may ignore priority 0 and 1 thermal mitigation requests; for level 2 requests, the modem may end a voice call currently on hold and maintain an active voice call. A limited service mode (e.g. emergency calls only) is activated in response to level 3 thermal mitigation requests.

In some embodiments, the modem may issue an alert to a user through a user interface upon receipt of a level 1 thermal mitigation request. The alert may inform the user that one of the two calls should be terminated. The alert may request that the user identify a voice call that should be maintained if the thermal issue is escalated. A user-identified call may be maintained upon escalation to a level 2 thermal mitigation request. If the user declines to identify a call for termination, then a predefined default call may be maintained. The default call may be a currently active call or a call made through a dedicated voice subscription.

According to certain aspects, when two active RATs are detected and when a data call and a voice call are active, the modem may refrain from initiating thermal mitigation on the voice call until a level 3 thermal mitigation request is received. The modem may implement flow control on the data call in response to a level 1 thermal mitigation request. The modem may initiate transmitter power limit back-off procedures for the data call upon receiving a level 2 thermal mitigation request. Limited service mode activated in response to level 3 thermal mitigation requests typically causes the modem to cease data transmissions.

According to certain aspects, when two active RATs are detected and when a data call and two voice call are active, the modem may refrain from initiating thermal mitigation on the voice calls until a level 3 thermal mitigation request is received. The modem may implement flow control on the data call in response to a level 1 thermal mitigation request. The modem may initiate transmitter power limit back-off procedures for the data call upon receiving a level 2 thermal mitigation request. Limited service mode activated in response to level 3 thermal mitigation requests typically causes the modem to cease data transmissions.

Figure 9:
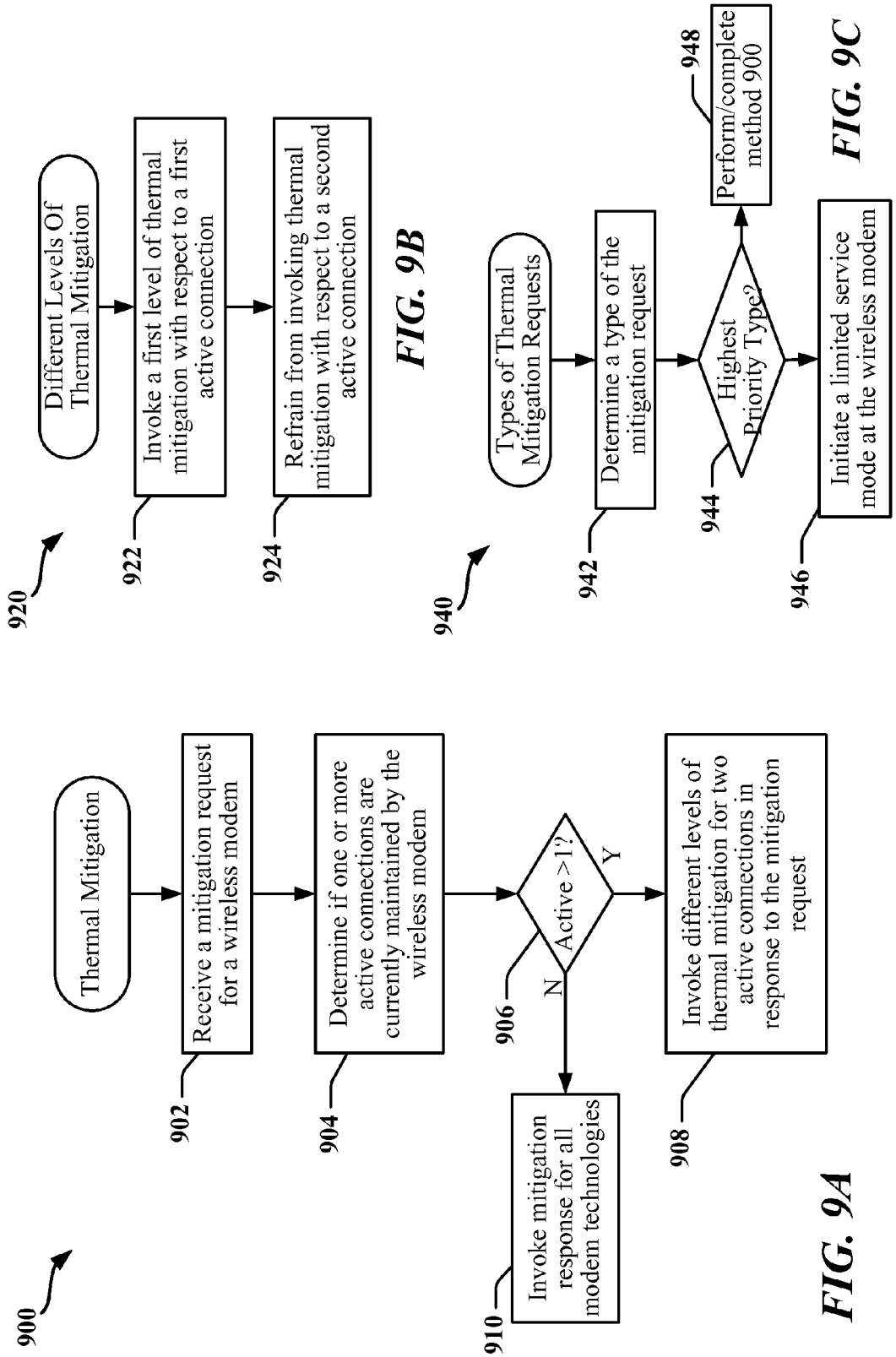
FIGS. 9A-9C are flow charts of an example method of thermal mitigation when one or more connections are active.

FIG. 9A includes a flowchart 900 illustrating a method for thermal mitigation in a modem. The method may be performed by an access terminal 202 (see FIG. 2).

At step 902, the access terminal 202 may receive or generate a thermal mitigation request. The thermal mitigation request may be generated in response to a temperature measurement within the access terminal 202.

At step 904, the access terminal 202 may determine whether one or more active connections are currently maintained by the modem. A first active connection and a second active connection may be maintained by the modem. The second active connection may be associated with a higher quality of service than the first active connection. One or more of the first active connection and the second active connection may carry a voice or video call. In some instances, both the first active connection and the second active connection carry voice calls.

At step 906, a decision may be made based on the determination of whether one or more active connections are currently maintained by the modem. If it is determined that one or no active connections are currently maintained by the modem, then at step 910 the access terminal 202 may invoke mitigation for all transceivers and/or other components of the access terminal 202. If it is determined that a plurality of connections are maintained by the modem, then the method proceeds to step 908.

At step 908, the access terminal 202 may invoke different levels of thermal mitigation for two active connections in response to the mitigation request. In one example, the different levels of thermal mitigation may be invoked as described in relation to the flowchart 920 shown in FIG. 9B.

FIG. 9B includes a flowchart 920 illustrating a method for thermal mitigation in a modem. The method may be performed by an access terminal 202. The method may be performed when the access terminal 202 has determined that different levels of thermal mitigation should be invoked for two active connections in response to the mitigation request. In one example, such decision is made at step 906 of the method illustrated in flowchart 900 in FIG. 9A.

At step 922, the access terminal 202 may invoke thermal mitigation with respect to a first active connection. The first active connection may carry a voice call. The voice-call may be on-hold and the thermal mitigation invoked with respect to the first active connection may include terminating the on-hold voice call. The thermal mitigation invoked with respect to the first active connection may include terminating a call made through a dedicated voice subscription. The thermal mitigation invoked with respect to the first active connection may include providing a notification of potential termination of at least one voice call.

The first active connection may comprise a data connection. The thermal mitigation invoked with respect to the first active connection may include initiating flow control on the first active connection. The thermal mitigation invoked with respect to the first active connection may include modifying flow control on the first active connection.

The thermal mitigation invoked with respect to the first active connection may include initiating or increasing a power limitation of a transmitter of the modem.

At step 924, the access terminal 202 may refrain from invoking thermal mitigation with respect to a second active connection.

In certain embodiments, the first active connection is identified as being associated with a first SIM of a DSDA device and the second active connection is identified as being associated with a second SIM of the DSDA device. Thermal mitigation may be selectively invoked based on a determination based on subscriptions corresponding to the first and second SIMs. The modem may comprise a plurality of power amplifiers. At least one power amplifier may be associated with a thermal issue and the at least one power amplifier may be identified as being used by the first active connection. The at least one power amplifier may be identified as a member of a group of power amplifiers associated with the thermal issue. Each of the group of power amplifiers is located in a common thermal zone of an integrated circuit device. The at least one power amplifier may be identified based on a measurement obtained by a thermal sensor physically located in the vicinity of the group of power amplifiers.

In some embodiments, at least one power amplifier may be associated with a subscription of the DSDA device. The thermal mitigation with respect to the first active connection may be invoked based on the association between the at least one power amplifier and the subscription.

FIG. 9C includes a flowchart 940 illustrating a method for thermal mitigation in a modem. The method may be performed by an access terminal 202 in response to a mitigation request. In one example, the mitigation request may be received at step 902 of the method illustrated in flowchart 900 of FIG. 9A and the method described in flowchart 940 may be performed upon receipt of the mitigation request, or at one or more other steps of the method illustrated in flowchart 900 of FIG. 9A.

At step 942, the access terminal 202 may determine a type of a mitigation request received or generated at the wireless modem.

At step 944, a decision is taken based on the determination of the type of the mitigation request. If the mitigation request is a highest priority type mitigation request, then the access terminal 202 may invoke and/or enforce a limited service mode of operation at step 946. Limited service mode typically applies to all transceivers in the modem. In one example, limited service mode may prevent all calls except emergency calls.

If the mitigation request is not a highest priority type mitigation request, the mitigation request may be handled according to other procedures. In one example, the method proceeds through step 948 to execute or resume execution of the method described in relation to flowchart 900 shown in FIG. 9A.

Figure 10:
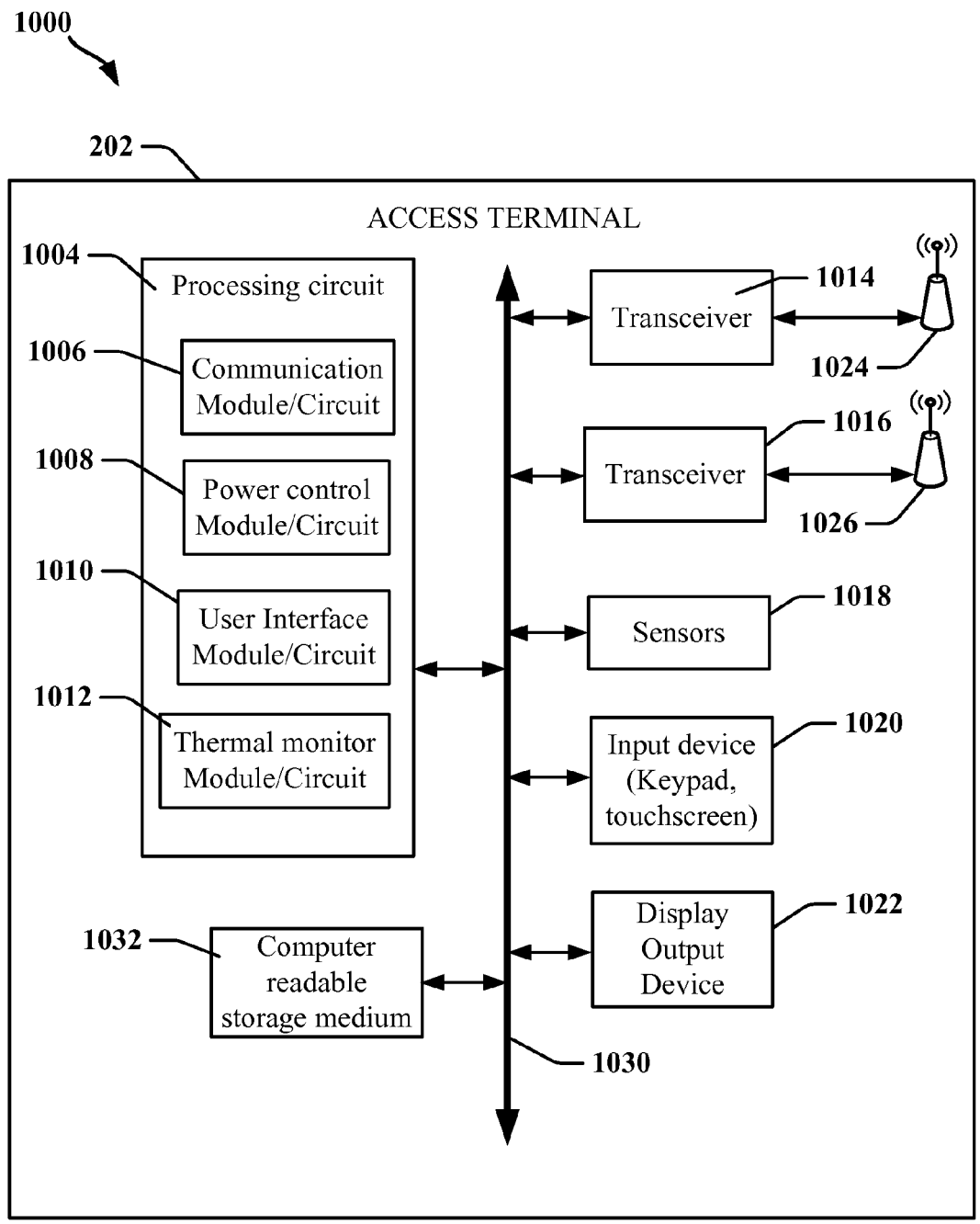
FIG. 10 is a component block diagram of an apparatus that is operable to mitigate thermal issues in an access terminal.

FIG. 10 is a diagram 1000 illustrating an example of a hardware implementation for an apparatus, which may be an access terminal 202 employing a processing circuit 1004. The processing circuit 1004 may be implemented with a bus architecture, represented generally by the bus 1030. The bus 1030 may include any number of interconnecting buses and bridges depending on the application and attributes of the processing circuit 1004 and overall design constraints. The bus 1030 may link together various circuits including one or more processors and/or hardware modules, processing circuit 1004, and the non-transitory computer-readable medium 1032. The bus 1030 may also link various other circuits such as timing sources, peripherals, voltage regulators, and power management circuits, which are well known in the art, and therefore, will not be described any further.

The processing circuit 1004 may be coupled to one or more transceivers 1014, 1016. The transceivers 1014, 1016 may be coupled to one or more antennas 1024, 1026. The transceivers 1014, 1016 provide a means for communicating with various other apparatus over a transmission medium. The processing circuit 1004 may include one or more processors responsible for general processing, including the execution of software stored on the computer-readable medium 1032. The software, when executed by the processing circuit 1004, causes the processing circuit 1004 to perform the various functions described supra for any particular apparatus. The non-transitory computer-readable medium 1032 may also be used for storing data that is manipulated by the processing circuit 1004 when executing software. The processing system further includes at least one of the modules 1006, 1008, 1010 and 1012. The modules may be software modules running on the processing circuit 1004, resident/stored in the computer readable medium 1032, one or more hardware modules coupled to the processing circuit 1004, or some combination thereof. The processing circuit 1004 may be an embedded component of access terminal 202.

An access terminal 202 may also comprise one or more input devices 1020 that may include a keypad, a keyboard and/or a touch-screen or another such device. An access terminal may comprise one or more display devices 1024. An access terminal may comprise or be coupled to one or more sensors 1018. Sensors 1018 may include thermal sensors deployed throughout access terminal 202, including in proximity to power amplifiers in transceivers 1014 and/or 1016, and may comprise one or more of a thermocouple, a thermistor, an infrared detector and so on.

In one configuration, the apparatus 202 for wireless communication includes means 1004, 1006, 1014, 1016, 1024, 1026 for receiving a mitigation request, means 1004, 1006, 1014, 1016, 1024, 1026 for determining whether one or more active connections are currently maintained by the modem, means 1004, 1008, 1014, 1016 for controlling power usage in the modem, means 1004, 1010, 1020, 1022 for providing a notification of potential termination of the voice or video call, and means 1004, 1012, 1018 for identifying a thermal issue in the modem.

The term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die.

The terms wafer and substrate may be used herein to include any structure having an exposed surface with which to form an integrated circuit (IC) according to aspects of the present disclosure. The term "die" may be used herein to include an IC. A die may include one or more circuits. The term substrate is understood to include semiconductor wafers. The term substrate is also used to refer to semiconductor structures during fabrication, and may include other layers that have been fabricated thereupon. The term substrate includes doped and undoped semiconductors, epitaxial semiconductor layers supported by a base semiconductor, or semiconductor layers supported by an insulator, as well as other semiconductor structures well known to one skilled in the art. The term insulator is defined to include any material that is less electrically conductive than materials generally referred to as conductors by those skilled in the art. The term "unit" may refer to a component that is part of a die and/or circuit of a die. A unit may be located in one die or a unit may be part of a semiconductor device, system and/or package that is distributed over several dice and/or circuits. Thus, a unit may refer to a component that is physically and/or logically located in several locations.

One or more of the components, steps, features and/or functions illustrated in FIGS. 1-10 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-6 and 10 may be configured to perform one or more of the methods, features, or steps described herein. The novel algorithms described herein may also be efficiently implemented in software and/or embedded in hardware.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a non-transitory machine readable storage medium may be one or more devices for storing instructions and data, including read-only memory (ROM), random access memory (RAM), magnetic disk storage mediums, optical storage mediums, flash memory devices and/or other machine readable mediums for storing information. The terms "machine readable medium" or "machine readable storage medium" include, but is not limited to portable or fixed storage devices, optical storage devices, and various other mediums capable of storing instruction(s) and/or data.

Furthermore, embodiments may be implemented by hardware, software, firmware, middleware, microcode, or any combination thereof. When implemented in software, firmware, middleware or microcode, the program code or code segments to perform the necessary tasks may be stored in a non-transitory machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits (e.g., processing circuit), elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may comprise a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of non-transitory storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing aspects of the disclosure are merely examples and are not to be construed as limiting the invention. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A method of thermal mitigation, comprising:
   receiving a mitigation request for a wireless modem;
   determining whether one or more active connections are currently maintained by the wireless modem; and
   invoking different levels of thermal mitigation for two active connections in response to the mitigation request if it is determined that a plurality of active connections is currently maintained by the wireless modem.

2. The method of claim 1, wherein invoking the different levels of thermal mitigation for the two active connections includes:
   invoking a first level of thermal mitigation with respect to a first active connection; and
   refraining from invoking thermal mitigation with respect to a second active connection.

3. The method of claim 1, wherein the different levels of thermal mitigation for the two active connections are invoked based on priorities associated with the two active connections.

4. The method of claim 3, wherein a highest priority is assigned to an active connection that supports a voice or video call.

5. The method of claim 3, wherein the priorities associated with the two active connections correspond to quality of service priorities associated with the two active connections.

6. The method of claim 3, wherein each of the two active connections carries a voice or video call.

7. The method of claim 6, wherein invoking the different levels of thermal mitigation for the two active connections includes terminating a video or voice call carried by a first active connection while maintaining a video or voice call carried by the other active connection.

8. The method of claim 6, wherein invoking the different levels of thermal mitigation for the two active connections includes terminating an on-hold voice call or a call made through a dedicated voice subscription.

9. The method of claim 6, wherein invoking the different levels of thermal mitigation for the two active connections includes providing a notification of potential termination of at least one of the voice or video calls.

10. The method of claim 1, further comprising:
    determining a type of the mitigation request; and
    initiating a limited service mode at the wireless modem when the mitigation request is determined to have a highest priority type.

11. The method of claim 1, wherein invoking the different levels of thermal mitigation for the two active connections includes initiating flow control on one active connection.

12. The method of claim 1, wherein invoking the different levels of thermal mitigation for the two active connections includes modifying flow control on one active connection.

13. The method of claim 1, wherein invoking the different levels of thermal mitigation for the two active connections includes initiating or increasing a power limitation of a transmitter of the wireless modem.

14. The method of claim 1, wherein:
    a first active connection is associated with a first subscriber identification module (SIM) of a dual SIM dual active (DSDA) device;
    a second active connection is associated with a second SIM of the DSDA device; and
    the different levels of thermal mitigation for the two active connections are invoked based on priorities associated with subscriptions corresponding to the first and second SIMs.

15. The method of claim 1, wherein invoking the different levels of thermal mitigation for the two active connections includes:
    identifying at least one power amplifier related to a thermal issue; and
    invoking thermal mitigation with respect to an active connection associated with the at least one power amplifier.

16. The method of claim 15, wherein identifying the at least one power amplifier includes identifying a group of power amplifiers related to the thermal issue.

17. The method of claim 16, wherein each of the group of power amplifiers is located in a common thermal zone of an integrated circuit device.

18. The method of claim 16, wherein the at least one power amplifier is identified based on a measurement obtained by a thermal sensor physically located in a vicinity of the group of power amplifiers.

19. The method of claim 15, further comprising associating the at least one power amplifier with a subscription of a dual SIM dual active (DSDA) device, wherein the different levels of thermal mitigation for the two active connections are invoked based on the association between the at least one power amplifier and the subscription.

20. A wireless modem, comprising:
    a plurality of power amplifiers, each power amplifier being associated with an active connection; and
    a processor configured to:
      receive a mitigation request for the wireless modem;
      determine whether one or more active connections are currently maintained by the wireless modem; and
      invoke different levels of thermal mitigation for two active connections in response to the mitigation request if it is determined that a plurality of active connections is currently maintained by the wireless modem.

21. The wireless modem of claim 20, wherein the processor is configured to invoke the different levels of thermal mitigation for the two active connections by:
    invoking a first level of thermal mitigation with respect to a first active connection; and
    refraining from invoking thermal mitigation with respect to a second active connection.

22. The wireless modem of claim 20, wherein the processor is configured to invoke the different levels of thermal mitigation for the two active connections based on priorities associated with the two active connections.

23. The wireless modem of claim 22, wherein a highest priority is assigned to the active connection that supports a voice or video call.

24. The wireless modem of claim 22, wherein the priorities associated with the two active connections correspond to quality of service priorities associated with the two active connections.

25. The wireless modem of claim 22, wherein each of the two active connections carries a voice or video call.

26. The wireless modem of claim 25, wherein the processor is configured to invoke the different levels of thermal mitigation for the two active connections by terminating a video or voice call carried by a first active connection while maintaining a video or voice call carried by the other active connection.

27. The wireless modem of claim 25, wherein the processor is configured to invoke the different levels of thermal mitigation for the two active connections by terminating an on-hold voice call or a call made through a dedicated voice subscription.

28. The wireless modem of claim 25, wherein the processor is configured to invoke the different levels of thermal mitigation for the two active connections by providing a notification of potential termination of at least one voice or video calls.

29. The wireless modem of claim 20, wherein the processor is configured to:
determine a type of the mitigation request; and
initiate a limited service mode at the wireless modem when the mitigation request is determined to have a highest priority type.

30. The wireless modem of claim 20, wherein the processor is configured to invoke the different levels of thermal mitigation for the two active connections by initiating flow control on one active connection.

31. The wireless modem of claim 20, wherein the processor is configured to invoke the different levels of thermal mitigation for the two active connections by modifying flow control on one active connection.

32. The wireless modem of claim 20, wherein the processor is configured to invoke the different levels of thermal mitigation for the two active connections by initiating or increasing a power limitation of a transmitter of the wireless modem.

33. The wireless modem of claim 20, wherein:
a first active connection is associated with a first subscriber identification module (SIM) of a dual SIM dual active (DSDA) device;
a second active connection is associated with a second SIM of the DSDA device; and
the processor is configured to invoke the different levels of thermal mitigation for the two active connections based on priorities associated with subscriptions corresponding to the first and second SIMs.

34. The wireless modem of claim 20, wherein the processor is configured to invoke the different levels of thermal mitigation for the two active connections by:
identifying at least one power amplifier related to a thermal issue; and
invoking thermal mitigation with respect to the active connection associated with the at least one power amplifier.

35. The wireless modem of claim 34, wherein the processor is configured to identify the at least one power amplifier by identifying a group of power amplifiers related to the thermal issue.

36. The wireless modem of claim 35, wherein each of the group of power amplifiers is located in a common thermal zone of an integrated circuit device.

37. The wireless modem of claim 35, wherein the processor is configured to identify the at least one power amplifier based on a measurement obtained by a thermal sensor physically located in a vicinity of the group of power amplifiers.

38. The wireless modem of claim 34, wherein the processor is configured to associate the at least one power amplifier with a subscription of a dual SIM dual active (DSDA) device, wherein the processor is configured to invoke the different levels of thermal mitigation for the two active connections based on the association between the at least one power amplifier and the subscription.

39. An apparatus for wireless communication, comprising:
means for receiving a mitigation request for a wireless modem;
means for determining whether one or more active connections are currently maintained by the wireless modem; and
means for invoking different levels of thermal mitigation for two active connections in response to the mitigation request if it is determined that a plurality of active connections is currently maintained by the wireless modem.

40. The apparatus of claim 39, wherein means for invoking the different levels of thermal mitigation for the two active connections comprises means for invoking a first level of thermal mitigation with respect to a first active connection and refraining from invoking thermal mitigation with respect to a second active connection in response to the mitigation request.

41. The apparatus of claim 39, wherein the different levels of thermal mitigation for the two active connections are invoked based on priorities associated with the two active connections.

42. The apparatus of claim 41, wherein a highest priority is assigned to an active connection that supports a voice or video call.

43. The apparatus of claim 41, wherein the priorities associated with the two active connections correspond to quality of service priorities associated with the two active connections.

44. The apparatus of claim 41, wherein each of the two active connections carries a voice or video call.

45. The apparatus of claim 44, wherein means for invoking the different levels of thermal mitigation for the two active connections comprises means for terminating a video or voice call carried by a first active connection and maintaining a video or voice call carried by the other active connection in response to the mitigation request.

46. The apparatus of claim 44, wherein means for invoking the different levels of thermal mitigation for the two active connections comprises means for terminating an on-hold voice call or a call made through a dedicated voice subscription in response to the mitigation request.

47. The apparatus of claim 44, wherein means for invoking the different levels of thermal mitigation for the two active connections comprises means for providing a notification of potential termination of at least one of the voice or video calls in response to the mitigation request.

48. The apparatus of claim 39, further comprising:
means for determining a type of the mitigation request; and
means for initiating a limited service mode at the wireless modem when the mitigation request is determined to have a highest priority type.

49. The apparatus of claim 39, wherein means for invoking the different levels of thermal mitigation for the two active connections comprises means for initiating flow control on one active connection in response to the mitigation request.

50. The apparatus of claim 39, wherein means for invoking the different levels of thermal mitigation for the two active connections comprises means for modifying flow control on one active connection in response to the mitigation request.

51. The apparatus of claim 39, wherein means for invoking the different levels of thermal mitigation for the two active connections comprises means for imitating or increasing a power limitation of a transmitter of the wireless modem in response to the mitigation request.

52. The apparatus of claim 39, wherein:
a first active connection is associated with a first subscriber identification module (SIM) of a dual SIM dual active (DSDA) device;
a second active connection is associated with a second SIM of the DSDA device; and
the different levels of thermal mitigation for the two active connections are invoked based on priorities associated with subscriptions corresponding to the first and second SIMs.

53. The apparatus of claim 39, wherein means for invoking the different levels of thermal mitigation for the two active connections comprising means for responding to the mitigation request by:
  identifying at least one power amplifier related to a thermal issue; and
  invoking thermal mitigation with respect to an active connection associated with the at least one power amplifier.

54. The apparatus of claim 53, wherein the at least one power amplifier is identified in a group of power amplifiers related to the thermal issue.

55. The apparatus of claim 54, wherein each of the group of power amplifiers is located in a common thermal zone of an integrated circuit device.

56. The apparatus of claim 54, wherein the at least one power amplifier is identified based on a measurement obtained by a thermal sensor physically located in a vicinity of the group of power amplifiers.

57. The apparatus of claim 53, further comprising means for associating the at least one power amplifier with a subscription of a dual SIM dual active (DSDA) device, wherein the different levels of thermal mitigation for the two active connections are selected based on the association between the at least one power amplifier and the subscription.

58. A non-transitory processor-readable storage medium having stored thereon one or more instructions which, when executed by at least one processing circuit, cause the at least one processing circuit to:
  receive a mitigation request for a wireless modem;
  determine whether one or more active connections are currently maintained by the wireless modem; and
  invoke different levels of thermal mitigation for two active connections in response to the mitigation request if it is determined that a plurality of active connections is currently maintained by the wireless modem.

59. The non-transitory processor-readable storage medium of claim 58, wherein the stored one or more instructions, when executed by at least one processing circuit, cause the at least one processing circuit to:
  invoke a first level of thermal mitigation with respect to a first active connection; and
  refrain from invoking thermal mitigation with respect to a second active connection.

60. The non-transitory processor-readable storage medium of claim 58, wherein the different levels of thermal mitigation for the two active connections are selected based on priorities associated with the two active connections.

61. The non-transitory processor-readable storage medium of claim 60, wherein a highest priority is assigned to an active connection that supports a voice or video call.

62. The non-transitory processor-readable storage medium of claim 60, wherein the priorities associated with the two active connections correspond to quality of service priorities associated with the two active connections.

63. The non-transitory processor-readable storage medium of claim 60, wherein each of the two active connections carries a voice or video call.

64. The non-transitory processor-readable storage medium of claim 63, wherein the stored one or more instructions, when executed by at least one processing circuit, cause the at least one processing circuit to respond to the mitigation request by terminating a video or voice call carried by a first active connection, and maintaining a video or voice call carried by the other active connection.

65. The non-transitory processor-readable storage medium of claim 63, wherein the stored one or more instructions, when executed by at least one processing circuit, cause the at least one processing circuit to respond to the mitigation request by terminating an on-hold voice call or a call made through a dedicated voice subscription.

66. The non-transitory processor-readable storage medium of claim 63, wherein the stored one or more instructions, when executed by at least one processing circuit, cause the at least one processing circuit to respond to the mitigation request by providing a notification of potential termination of at least one of the voice or video calls.

67. The non-transitory processor-readable storage medium of claim 58, wherein the stored one or more instructions, when executed by at least one processing circuit, cause the at least one processing circuit to:
  determine a type of the mitigation request; and
  initiate a limited service mode at the wireless modem when the mitigation request is determined to have a highest priority type.

68. The non-transitory processor-readable storage medium of claim 58, wherein the stored one or more instructions, when executed by at least one processing circuit, cause the at least one processing circuit to respond to the mitigation request by initiating flow control on one active connection.

69. The non-transitory processor-readable storage medium of claim 58, wherein the stored one or more instructions, when executed by at least one processing circuit, cause the at least one processing circuit to respond to the mitigation request by modifying flow control on one active connection.

70. The non-transitory processor-readable storage medium of claim 58, wherein the non-transitory processor-readable storage medium has one or more instructions, when executed by at least one processing circuit, cause the at least one processing circuit to respond to the mitigation request by initiating or increasing a power limitation of a transmitter of the wireless modem.

71. The non-transitory processor-readable storage medium of claim 58, wherein:
  a first active connection is associated with a first subscriber identification module (SIM) of a dual SIM dual active (DSDA) device;
  a second active connection is associated with a second SIM of the DSDA device; and
  wherein the non-transitory processor-readable storage medium has one or more instructions which, when executed by at least one processing circuit, cause the at least one processing circuit to respond to the mitigation request by invoking the different levels of thermal mitigation for the two active connections based on priorities associated with subscriptions corresponding to the first and second SIMs.

72. The non-transitory processor-readable storage medium of claim 58, wherein the stored one or more instructions, when executed by at least one processing circuit, cause the at least one processing circuit to respond to the mitigation request by:
  identifying at least one power amplifier related to a thermal issue; and
  invoking thermal mitigation with respect to an active connection associated with the at least one power amplifier.

73. The non-transitory processor-readable storage medium of claim 72, wherein the stored one or more instructions, when executed by at least one processing circuit, cause the at least one processing circuit to respond to the mitigation request by identifying a group of power amplifiers related to the thermal issue.

74. The non-transitory processor-readable storage medium of claim 73, wherein each of the group of power amplifiers is located in a common thermal zone of an integrated circuit device.

75. The non-transitory processor-readable storage medium of claim 73, wherein the at least one power amplifier is identified based on a measurement obtained by a thermal sensor physically located in a vicinity of the group of power amplifiers.

76. The non-transitory processor-readable storage medium of claim 72, wherein the stored one or more instructions, when executed by at least one processing circuit, cause the at least one processing circuit to:
    associate the at least one power amplifier with a subscription of a dual SIM dual active (DSDA) device; and
    invoke the different levels of thermal mitigation for the two active connections based on the association between the at least one power amplifier and the subscription.

\* \* \* \* \*